(12) United States Patent
Cree et al.

(10) Patent No.: US 6,255,236 B1
(45) Date of Patent: Jul. 3, 2001

(54) STIFFENED LANE ELASTIC LAMINATE AND METHOD OF FORMING

(75) Inventors: James W. Cree, Mundeelein; Jeffrey A. Middlesworth, Wauconda; Stephen D. Bruce, Crystal Lake, all of IL (US)

(73) Assignee: Tredegar Film Products Corporation, Richmond, VA (US)

( * ) Notice: Subject to any disclaimer, the term of this patent is extended or adjusted under 35 U.S.C. 154(b) by 0 days.

(21) Appl. No.: 09/491,544

(22) Filed: Jan. 26, 2000

(51) Int. Cl.[7] .................................................. B32B 5/26
(52) U.S. Cl. .................. 442/328; 442/381; 442/399; 442/392
(58) Field of Search ................... 442/328, 381, 442/392, 399

(56) References Cited

U.S. PATENT DOCUMENTS

| | | | |
|---|---|---|---|
| 5,334,446 | * 8/1994 | Quantrille et al. | 428/284 |
| 5,624,424 | 4/1997 | Saisaka et al. | 604/385.2 |
| 5,807,368 | 9/1998 | Helmer | 604/373 |
| 5,840,412 | * 11/1998 | Wood et al. | 428/284 |
| 5,921,973 | * 7/1999 | Newirk et al. | 604/365 |
| 6,051,094 | * 4/2000 | Melbye et al. | 156/269 |
| 6,057,024 | * 5/2000 | Mleziva et al. | 428/114 |
| 6,096,668 | * 8/2000 | Abuto | 442/328 |

FOREIGN PATENT DOCUMENTS 0685586  12/1995  (EP) .

OTHER PUBLICATIONS

EPO Standard Search Report No. RS 104850 dated May 22, 2000.

* cited by examiner

Primary Examiner—Terrel Morris
Assistant Examiner—Norca L. Torres
(74) Attorney, Agent, or Firm—Jenkens & Gilchrist, PC (57) ABSTRACT

A laminate having a first nonwoven and a second nonwoven bonded to an elastic web. The laminate includes at least one elastic lane and at least one stiffened lane.

16 Claims, 5 Drawing Sheets

STIFFENED LANE ELASTIC LAMINATE AND METHOD OF FORMING

BACKGROUND OF THE INVENTION

1. Technical Field

This invention relates generally to elastic laminates, and more particularly to a laminate having an elastic polymer film core with at least one layer of an extensible nonwoven web bonded to each side of the elastic polymer film core, and having one or more substantially inelastic, non-extensible regions located in the laminate.

2. Background Art

There is a recognized need for a tear resistant elastic laminate that has a soft, comfortable outer surface. For example, in personal hygiene products such as diapers, there is a need for an elastic ear that can be stretched to provide a comfortable fit for the different anatomies of various wearers, improve the fit and comfort, reduce leakage, and be compatible with adhesive and mechanical fasteners. Therefore, there is a need to provide a lightweight cloth-like film based laminate that has an elastic recovery from stretching that is comparable to natural or synthetic rubber films in the transverse direction, and has a tear resistance that is similar to durable cotton or fabrics composed of LYCRA® synthetic fibers or filaments. However, processing of elastic laminate can be difficult due to the elastic properties. Additionally, for use as an elastic ear, the tear resistant laminate must be joined with other materials. The elastic properties of an elastic film, or laminate can cause difficulties in joining the laminate or film to other materials because the joint between the materials must be rigid. Therefore, there is a need for elastic laminates that have hybrid elastic and non-elastic properties and can facilitate the joining of the elastic laminate to other components.

SUMMARY OF THE INVENTION

The present invention includes an elastic web, a first nonwoven bonded to a first side of the elastic web, and a second nonwoven bonded to a second side of the elastic web. The laminate includes at least one dead lane or stiffened lane extending through the laminate, and at least one elastic lane.

BRIEF DESCRIPTION OF THE DRAWINGS

A more complete understanding of the structure and operation of the present invention may be had by reference to the following detailed description when taken in conjunction with the accompanying drawings, wherein.

DETAILED DESCRIPTION

The term "nonwoven web" as used herein means a fabric formed of randomly laid fibers or filaments to form a web wherein some of the fibers are bonded by fiber-to-fiber fusion, by fiber entanglement, or by thermal bonds such as point bonding.

The term "machine direction", as used herein, means the direction in which precursor webs are formed, which is the longitudinal direction of an uncut web and is indicated by arrow MD.

The term "transverse direction", as used herein means the cross direction, disposed at 90° to the machine direction, which is indicated by arrow TD.

Figure 1A:
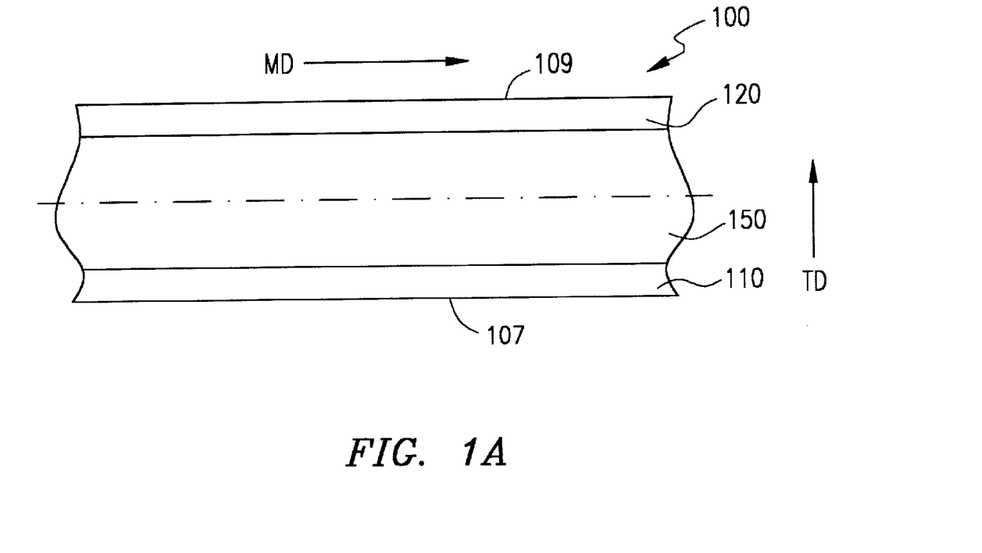
FIG. 1A is a first embodiment of the present invention with deadened lanes only on its edges.
Figure 1B:
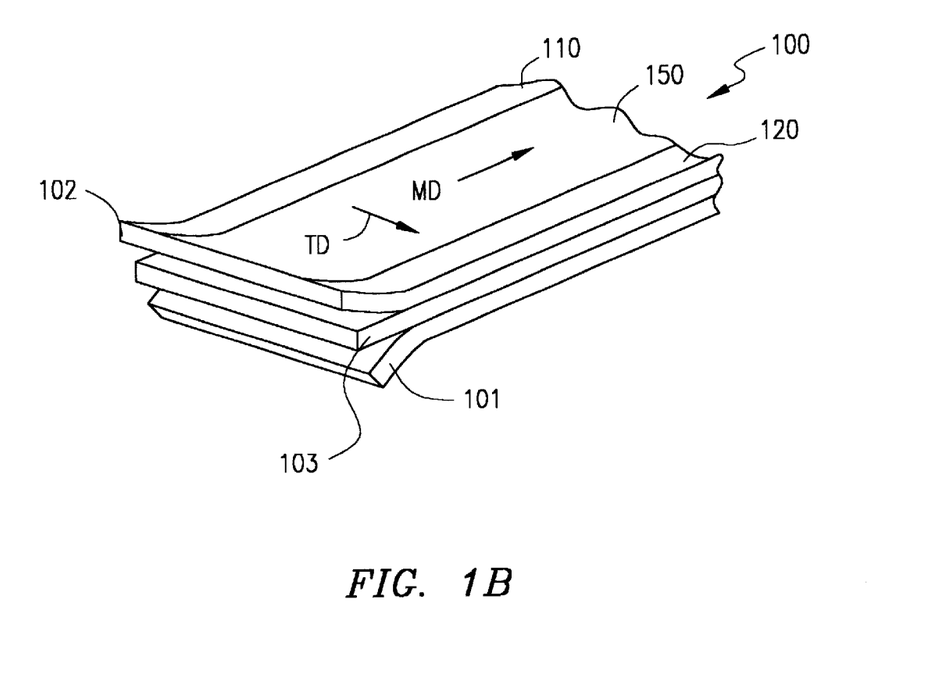
FIG. 1B is a perspective view of the first embodiment.

Referring now to the figures, and in particular to FIGS. 1A and 1B, there is shown an embodiment of the invention illustrated as the deadened lane or stiffened lane laminate 100. The deadened lane laminate 100 generally comprises a first nonwoven 101, a second nonwoven 102, and an elastic layer 103 bonded between the first nonwoven 101 and the second nonwoven 102. The deadened lane laminate 100 also includes an elastic lane 150, with a first deadened lane 110 and a second deadened lane 120 disposed on opposite sides of the elastic lane 150. The deadened lanes 110 and 120 are preferably placed along edges 107 and 109 respectively of laminate 100, and are adjacent to, and separated by elastic lane 150. In one embodiment, laminate 100 measures about 160 mm wide in the transverse direction TD, each of the deadened lanes 110, 120 are about 25 mm in the transverse direction TD, and the elastic lane 150 is about 110 mm in the transverse direction TD.

Elastic polymeric film 103 may be formed of either a metallocene-based low density polyethylene (m-LDPE), or a block-copolymer blend that contains styrene/butadiene/styrene (SBS), styrene/ethylene-butylene/styrene (SEBS), ethylene vinyl acetate (EVA), thermoplastic urethane, or cross-linked rubber. In an exemplary embodiment, a metallocene-catalyzed polyethylene film was used as elastic polymeric film 103. Elastic polymeric film 103 may have a basis weight of from about 18 g/m$^2$ to about 100 g/m$^2$. An m-LDPE film has a basis weight of about 25 g/m$^2$, whereas block copolymer films have a basis weight of about 50 g/m$^2$. A cross-linked rubber may have a basis weight of from about 30 g/m$^2$ to about 100 g/m$^2$. A material suitable for use as the elastic layer 103 includes a mix of about 25% LDPE formed from an Exxon LD202.48 resin and of about 75% metallocene-LLDPE formed from an Exxon ECD 357C32 resin. The LD202.48 has a density of about 0.917 g/cc, and about a 12 melt index. The ECD 357C32 has a density of about 0.917 g/cc, and about a 3.0 melt index.

The elastic polymeric film 103 has stretch to break properties greater than the stretch to break values of the first and second nonwovens 101, 102. In addition to having good elasticity, it is also desirable that elastic polymeric film 103 be puncture resistant. For example, if the deadened lane laminate 100 is used to form pull tabs, or ears, for diaper products, it is important that the laminate not be easily punctured by long fingernails. Since nonwoven materials generally provide little or no puncture resistance, elastic polymeric film 103 should have a puncture resistance, as represented by a Dart Impact value of at least 400 g, and in one embodiment, greater than 700 g. Additionally, the elastic polymeric film may be a perforated or apertured film.

In an exemplary embodiment, a low density polyethylene film (m-LDPE) having a basis weight of 25 g/m$^2$ was used as the elastic polymeric film 103 in a multiple layer laminate. The m-LLDPE film was tested and found to have the tensile properties listed below in Table I.

TABLE I

MEASURED PROPERTIES OF ELASTOMERIC FILM

| | | |
|---|---|---|
| Thickness | 1 mil | (25 μm) |
| Tensile force in transverse direction (per unit of sample width): | | |
| at 25% elongation | 181 N/m | (468 g/in) |
| at 50% elongation | 205 N/m | (532 g/in) |
| at break | 611 N/m | (1583 g/in) |
| Elongation at break | | 588.5% |
| Dart impact | | 700 g |

First and second nonwoven webs 101, 102 are formed of nonelastomeric thermoplastic fibers that have good, uniform but random, filament/fiber distribution. The fiber orientation should be such as to provide a degree of fiber randomization wherein at least some of the random fibers are disposed at an angle with respect to a machine direction MD of the web that is equal to or greater than 10°. In the preferred embodiments of the present invention, nonwoven webs 101, 102 are formed of spunbond nonwoven fibers which have a mass divided by length value of at least about 1.5 denier, and preferably from about 2.0 to about 3.5 denier per filament. The polymer composition of the fibers is desirably a polyolefin, and preferably polypropylene or polyethylene/polypropylene blends or other bicomponent blends having polypropylene as one component of the blend.

In one embodiment, a spunbond thermoplastic polypropylene nonwoven fabric used as a precursor web in forming nonwoven webs 101, 102 are produced by Avgol Nonwoven Industries, Ltd. of Holon, Israel and has the properties listed below in Table II.

TABLE II

MEASURED PROPERTIES OF NONWOVEN WEB

| | | |
|---|---|---|
| Basis Weight | 25 g/m$^2$ | |
| Tensile force in transverse direction (per unit of width): | | |
| at 25% elongation | 539 N/m | (1396 g/in) |
| at 50% elongation | 785 N/m | (2033 g/in) |
| at break | 843 N/m | (2183 g/in) |
| Elongation at break | | 72.5% |
| fiber thickness (mass divided by length) | | 2.0 denier |

The initial nonwoven fabric, described above in Table II, was consolidated laterally, preferably in accordance with the post-treatment processing of nonwoven webs described in U.S. Pat. No. Re. 35,206 reissued Apr. 16, 1996 to Charles B. Hassenboehler, Jr., et al. and titled POST-TREATMENT OF NONWOVEN WEBS. More specifically, in the illustrative embodiment, an initial precursor nonwoven web having a width of 1.37 m (54 in.) was laterally consolidated to a width of 0.84 m (33 in.), resulting in a neck-down ratio (ratio of original width to consolidated width) of about 1.6:1. In forming first and second nonwoven webs 101, 102, it is generally desirable to consolidate the precursor webs by a factor of from at least about 1.3:1 to about 4:1 (original width to consolidated width). As described above, it is desirable that the thermoplastic fibers comprising each of the nonwoven webs are randomly disposed within the web, preferably skewed at an angle greater than about 10° from machine direction MD. Preferably, at least about 2% and up to about 50% of the thermoplastic fibers are disposed in the skewed direction. Also, it is desirable that the basis weight of the precursor webs be in a range of from about 14 g/m$^2$ to about 60 g/m$^2$ (0.003 lb. per ft.$^2$ to 0.012 lb./ft.$^2$).

Importantly, first and second nonwoven webs 101, 102 have essential properties measured in the transverse direction TD, after consolidation. Consolidation should be sufficient to provide a non-elastic elongation range in the transverse direction of from about 20% to about 200%, and have an ultimate force to break in the transverse direction of greater than 580 N/m (1500 g/in.). Exemplary nonwoven webs 101, 102 were consolidated as described above to a neck-down ratio of about 1.6:1. The consolidated nonwoven web was then tested and found to have the elongation properties listed below in Table III.

TABLE III

PROPERTIES OF CONSOLIDATED NONWOVEN WEB

| | | |
|---|---|---|
| Tensile force in transverse direction (per unit of sample width): | | |
| at 25% elongation | 29 N/m | (74 g/in) |
| at 50% elongation | 266 N/m | (690 g/in) |
| at break | 666 N/m | (1725 g/in) |
| Elongation at break | | 109.8% |

Figure 2:
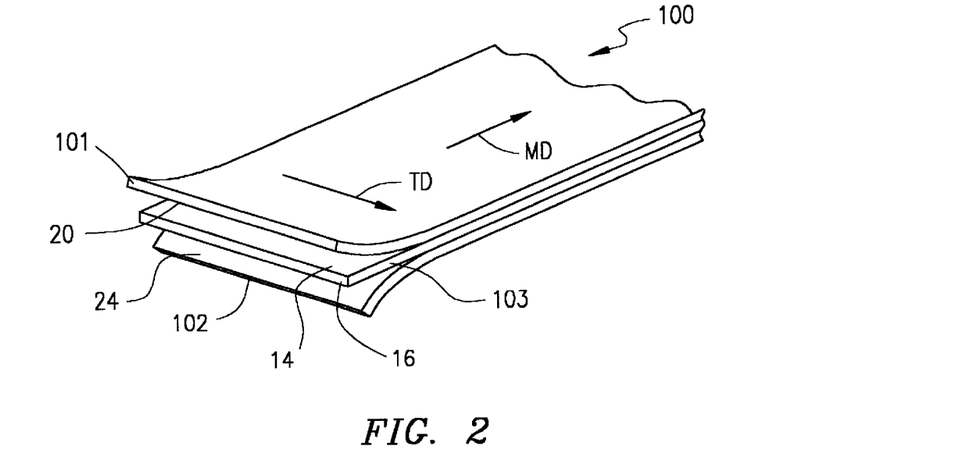
FIG. 2 is a three-dimensional view of a three-layer precursor laminate.

After forming, first and second nonwoven webs 101, 102 were bonded to elastomeric film 103. More specifically, as shown in FIG. 2, bottom surface 20 of first nonwoven web 101 is bonded to top surface 14 of film 103, and top surface 24 of second nonwoven web 102 is bonded to bottom surface 16 of elastomeric film 103. In addition, bonding may comprise fibers of first nonwoven web 101 bonding to fibers of second nonwoven web 102 through elastomeric film 103. Preferably, the bonding between respective webs 101, 102 and elastomeric film 103 is carried out simultaneously by the use of ultrasonic or fusion bonding. For this purpose, it is desirable that at least about 10% of the randomly disposed fibers in first and second webs 101, 102 have approximately equal softening temperatures. Nonwoven webs 101, 102 are thus welded, preferably by a combination of thermal and mechanical energy, to provide a peel force greater than 155 N/m (400 g/in.) of width.

Figure 3:
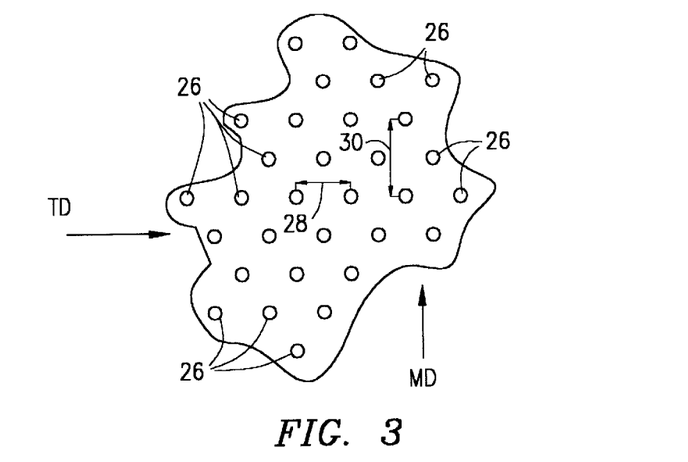
FIG. 3 is a plan view of a preferred weld bond pattern whereby the multiple layers of the precursor laminate from FIG. 7 are bonded together.

Referring now to FIG. 3, it has been found that a weld area of at least 3.0% of the total contiguous surface area at each of the layer interfaces should participate in the bonding to provide the adequate peel force. A pattern of ⅛ mm diameter weld areas, arranged in a geometric pattern illustrated in FIG. 3, is sufficient to provide the required mutual bonding area. Spacing 28 of the ⅛ mm diameter common bond areas 26 in transverse direction TD, in the illustrative example, is 4 mm. Spacing 30 between the ⅛ mm diameter common bond areas 26 in machine direction MD, of the illustrative example, is 7 mm. As illustrated in FIG. 3, the ⅛ mm common bond areas 26 are arranged to form a series of open trapezoidal figures using a "zig-zag" pattern. The spaced apart point bonds provided by the arrangement illustrated in FIG. 3 assures that all layers, 101, 102, 103 of the laminate 100 are adequately connected and that any force exerted on any one of layers 101, 102, 103, or on laminate 100 as a whole, is distributed through all of layers 101, 102, 103. This arrangement is markedly different than adhesive bonding or extrusion lamination which join only two adjacently disposed layers.

Figure 4:
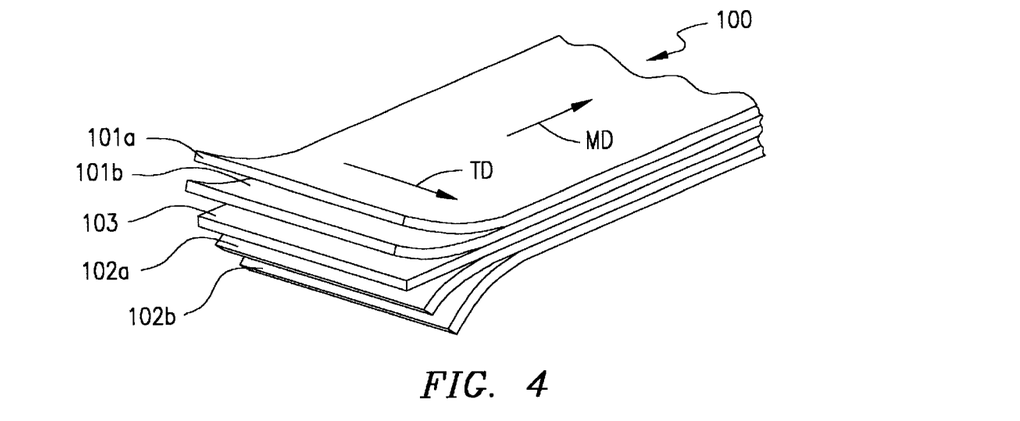
FIG. 4 is a three-dimensional view of a five-layer precursor laminate.

A second exemplary embodiment of a laminate 100 is illustrated in FIG. 4, which includes a five-layer composition. In this embodiment, the five-layer laminate 100 comprises two external layers of nonwoven web on each side of the centrally disposed elastomeric film 103. More specifically, first nonwoven web 101a and second nonwoven web 101b are bonded to each other and to elastomeric film 103 on upper side of the film 103, and third nonwoven web 102a and fourth nonwoven web 102b are bonded to each other and to bottom surface of elastomeric film 103. The two double plys of nonwoven web, 101a, 101b, and 102a, 102b strengthen laminate 100 while maintaining a soft external surface of laminate 100. In this embodiment, as well as in the earlier described embodiment of the three-layer laminate 100, it is necessary that at least a portion of the fibers comprising each of the nonwoven webs have a similar softening temperature. In forming five-layer laminate 100, all of the plys, i.e., first nonwoven web 101a, second nonwoven web 101b, elastomeric film 103, third nonwoven web 102a and fourth nonwoven web 102b, may be bonded simultaneously by ultrasonic welding or other point fusion welding methods. Alternatively, if so desired, first and second nonwoven webs 101a, 101b may be prebonded to each other to form a single structure, and the third and fourth nonwoven webs 102a, 102b may be prebonded to each other to form a second structure, prior to bonding the thus formed double nonwoven web structures to elastomeric film 103.

As illustrated above, the nonwoven webs 101, 102 can comprise two or more layers of nonwoven material. Also, if so desired, elastomeric film 103 may comprise two or more layers of film having similar, or even different, elasticity properties to provide greater tear resistance and minimize the possibility of catastrophic failure. In this arrangement, the nonwoven webs are respectively bonded to the top and bottom surfaces of the assembled multi-layered elastomeric film 103.

Consolidated webs, 101–102, and if so desired in the alternate embodiment, the additional nonwoven webs, are bonded, as described above, to form a laminate structure 100 having an elongation range of up to 200% and an ultimate force to break of greater than 772 N/m (2000 g/in.) in the elastic lane 150. The multiple layers of the laminate 100 are joined together by fusion bonds that have a collective area of at least 3.0% of the total contiguous surface area of adjacently disposed layers and a peel strength per unit width of greater than 154 N/m (400 g/in.) In the elastic lane 150. If elastomeric film 103 is a multilayered film, all layers of the elastomeric film structure may be simultaneously bonded together during bonding of the laminate structure.

In the present invention, the elastic lane 150 typically has the elastic properties imparted by the basic laminate of the elastomeric film 103 with the nonwovens 101 and 102, or 101a, 101b, 102a, and 102b as described above. The measured elongation characteristics of an exemplary embodiment described above having elastomeric film 103 and two nonwoven webs 101, 102, one bonded on each side of elastomeric film 103, are listed in Table IV. A two-inch wide sample of an elastic lane 150 from a laminate 100, was assembled in accordance with the above described method and tested using a 3-inch jaw gap and a 20-inch/minute crosshead speed.

TABLE IV

MEASURED PROPERTIES OF THREE-LAYER LAMINATE ELASTIC LANE

Tensile force in transverse direction
(per unit of width):

| | | |
|---|---|---|
| at 25% elongation | 240 N/m | (621 g/in.) |
| at 50% elongation | 513 N/m | (1328 g/in.) |
| at break | 1575 N/m | (4080 g/in.) |
| Elongation at break | | 135.6% |

In addition to the measured elongation properties listed above in Table IV, an additional sample was slit ½ inch deep across the sample width and then stretched in an attempt to induce a tear. The sample failed before a tear across the width of the sample was initiated. This test clearly demonstrated the excellent tear resistance of the elastic lane 150 from the laminate 100.

Figure 5:
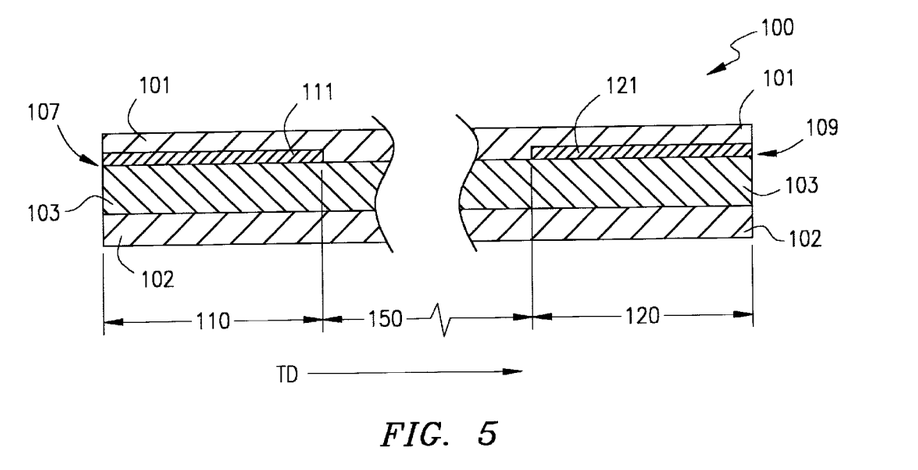
FIG. 5 is an embodiment with deadened lanes created by stiffening strips.

Referring now to FIG. 5, there is shown a version of the embodiment in FIGS. 1A and 1B, wherein the first deadened lane 110 is created by a first stiffening strip 111 disposed between the first nonwoven 101 and the elastic layer 103, and the second deadened lane 120 is created by a second stiffening strip 121 disposed between the first nonwoven 101 and the elastic layer 103. In one embodiment, the stiffening strips 111, 121 are lengths of polyethylene film having a thickness of about one mil. The strips 111, 121 are positioned adjacent to edges 7, 9 respectively of laminate 100. The first nonwoven web 101 is bonded to the upper surface of stiffening strips 111, 121, the bottom surfaces of which are bonded to the upper surface of the elastic layer 103, and the second nonwoven web 102 is bonded to the bottom surface of the elastic layer 103.

Alternatively, the stiffening strips 111, 121 may be disposed on the outer surface of one or both of the nonwoven webs 101, 102. In such case, the strips 111, 121 are positioned adjacent to edges 7, 9 respectively of laminate 100. However, the first nonwoven web 101 is bonded to the upper surface of the elastic layer 103, and the second nonwoven web 102 is bonded to the bottom surface of the elastic layer 103.

The strips 111, 121 may be formed of other polymeric materials that are compatible with the first and second nonwovens 101, 102, such as having similar melting temperatures or being formed of the same materials, such that they will bond readily to one another and will allow for formation of the laminate 100 through a one step lamination process. Laminate 100 may have an elastic elongation value greater than that of the nonwovens 101, 102, and an ultimate force to break of at least about 3,000 g/in$^2$.

Material suitable for use as stiffening strips 111, 121 include homopolymer polypropylene, impact copolymer polypropylene, and metallocene homopolymer polypropylene. Specific examples include an EX-29 1.0 mil thickness homopolymer polypropylene made of Exxon resin PP4403, an XPP-420 1.5 mil thickness impact copolymer polypropylene made of Exxon PD7623 resin, and an EX-531D 1.5 mil thickness metallocene homopolymer polypropylene.

Table V below, describes the results of tensile deformation tests in the transverse direction TD on deadened lanes 110, 120 of the laminate 100 having a stiffening strip such as 111, 121 formed therein of the material and thickness identified. Testing was carried out with a two-inch jaw gap and a twenty-inch crosshead speed. Transverse deformation was measured in the deadened lanes 110, 120. Included for comparison are the results of testing carried out on an elastic lane 150 adjacent to the tested deadened lanes 110, 120.

TABLE V

TENSILE DEFORMATION TEST DATA

| PROPERTIES: | EX-29 1.0 mil thickness | | XPP-420 1.5 mil thickness | | EX-531D 1.5 mil thickness | |
| --- | --- | --- | --- | --- | --- | --- |
| | DEAD. | ELASTIC | DEAD. | ELASTIC | DEAD. | ELASTIC |
| TD 5% (g/in) | 2589 | 278 | 1742 | 340 | 2345 | 297 |
| TD 10% (g/in) | 3182 | 410 | 2131 | 464 | 2729 | 432 |
| TD 25% (g/in) | 3240 | 563 | 2183 | 607 | 2778 | 610 |
| TD 50% (g/in) | 3369 | 1032 | 2769 | 1126 | 3759 | 1313 |
| Tensile Force at Ultimate Deformation (g/in) | 5796 | 4228 | 5013 | 4155 | 5447 | 4153 |
| Elongation at Ultimate Deformation (%) | 147.3 | 145.4 | 125.8 | 137.3 | 106.8 | 130.2 |

Figure 6:
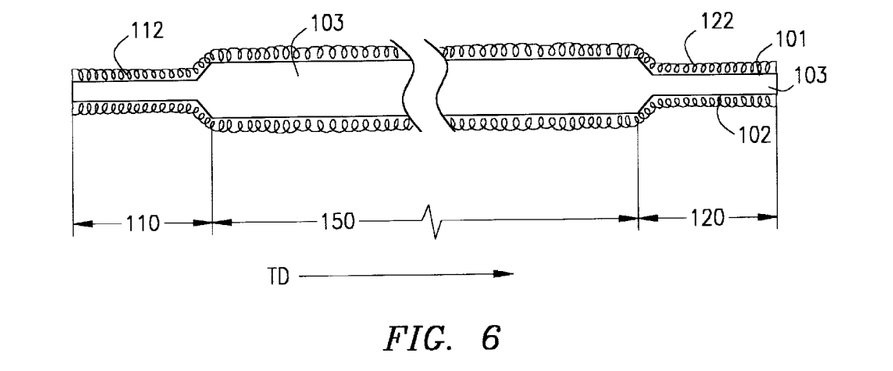
FIG. 6 is an embodiment version with the deadened lanes created by a bonded zone.

Referring now to FIG. 6, there is shown a cross-section of another version of the deadened lane laminate 100 from FIGS. 1A and 1B, wherein the first deadened lane 110 is created by a first deadened lane stiffening bond zone 112, and the second deadened lane 120 is created by a second deadened lane stiffening bond zone 122. The stiffening bond zones 112, 122, according to this version, comprise zones in which substantially all of the areas between first, and preferably second, nonwoven webs 101, 102, and elastic layer 103 are mutually bonded. The first and second nonwoven webs 101, 102 may additionally form film-like layers within the stiffening bond zones 112, 122, as a result of substantial fusion of the fibers composing webs 101, 102. This may also result in inter-web fiber bonding through the elastic layer 103.

Figure 7:
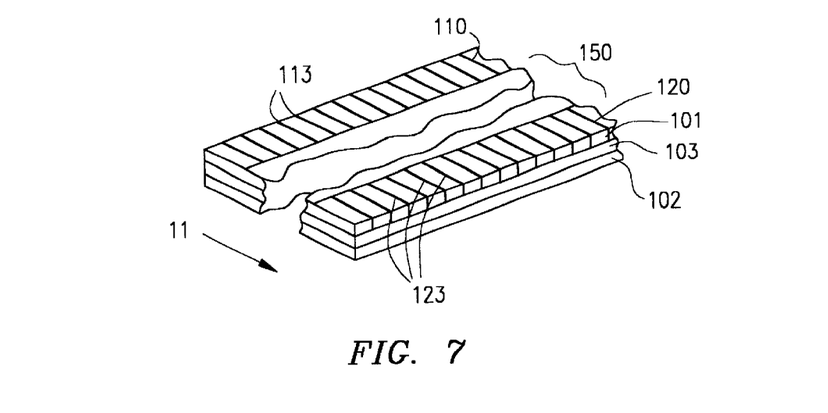
FIG. 7 is an embodiment version with the deadened lanes created by bonded points.

Referring now to FIG. 7, there is shown a perspective view of another version of the deadened lane laminate 100 from FIGS. 1A and 1B, wherein the first deadened lane 110 is created by first deadened lane stiffening bond points 113, and the second deadened lane 120 is created by second deadened lane stiffening bond points 123. As illustrated, the stiffening bond points 113, 123 are formed as line-segments, extending, as an example, across the width of the deadened lanes 110, 120 in the transverse direction TD. Similarly to the stiffening bond zones 112, 122 above, within the line-segments in the first and second nonwovens 101, 102 may form film-like layers. In one embodiment, the stiffening bond points 113, 123, formed as line segments, are about ⅛ in. wide in machine direction MD, and are separated by no more than about ¼ in. The mutually bonded surface areas comprising the stiffening bond points 113, 123 are significantly more than 3% of the respective total mutually opposed surface areas of the deadened lanes 110, 120 respectively. In one embodiment the areas are at least about 15%, and are preferably about 20 to about 30% of those areas. Although the stiffening bond points 113 and 123 are illustrated as line-segments extending uninterrupted across the deadened lanes 110 and 120, respectively, the stiffening bond points 113 and 123 can be discontinuous line-segments, numerous circular bonding points, or any other series of bonding points that create stiffness within the deadened lanes 110 and 120 in the machine direction MD.

Figures 8, 9:
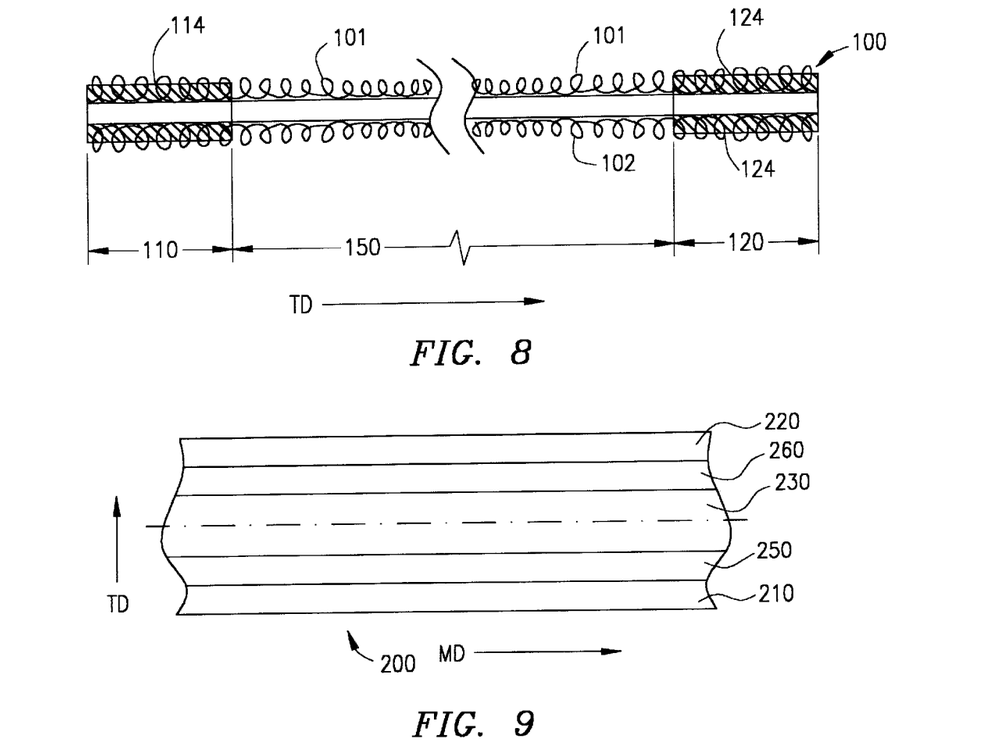
FIG. 8 is an embodiment version with the deadened lanes created by adhesive.
FIG. 9 is a second embodiment or the present invention with deadened lanes at its edges and a center deadened lane.

Referring now to FIG. 8, there is shown a cross-sectional view of another version of the deadened lane laminate 100 from FIGS. 1A and 1B, wherein the first deadened lane 110 created by a first adhesive layer 114, and the second deadened lane 120 is created by a second adhesive layer 124. In this version, adhesive layers 114, 124 are interposed between first, and preferably second, nonwovens 101, 102 and elastic layer 103. In one embodiment, adhesive layers 114, 124 adhere fibers within nonwovens 101, 102 to other such fibers, and to elastic layer 103.

Referring now to FIG. 9, in a further embodiment, there are three deadened lanes, a first 210, second 220, and third 230, and two elastic lanes 250, 260. First and second deadened lanes 210, 220 may be placed along edges 107 and 109 respectively of laminate 200, with lanes 230 substantially centered therebetween. First elastic lane 250 is adjacent to, and separates deadened lanes 210 and 230, and second elastic lane 260 is adjacent to, and separates deadened lanes 220 and 230.

Figure 10:
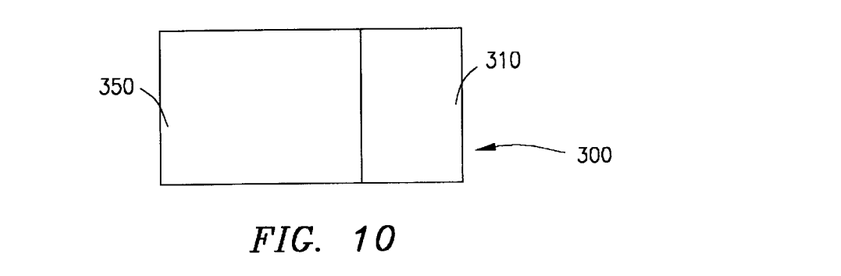
FIG. 10 is an elastic tab with a single side non-elastic zone taken from the first embodiment with deadened lanes only at its edges.

Referring now to FIG. 10, there is shown an elastic tab 300 with a single side non-elastic zone 310. The elastic tab 300 is formed by cutting the laminate 100 in the machine direction MD along the center line CL, and cutting a strip of the laminate 100, 200 in the transverse direction TD. The elastic tab 300 therefore contains the non-elastic zone 310 formed by one of the deadened lanes 110, 120, 210, 220, 230, and an elastic zone 350 formed by a portion of the elastic lane 150, 250, 260. In an exemplary embodiment, one end of the elastic tab 300, such as that formed by non-elastic zone 310, may be joined, such as by gluing, to a sanitary article such as a diaper, to create an ear for attachment to other portions of the diaper. The other end, non-elastic zone 350, may be formed to accept mechanical hooks, one side of a hook and pile fasteners, fastening tape, or other fasteners therein.

Figure 11:
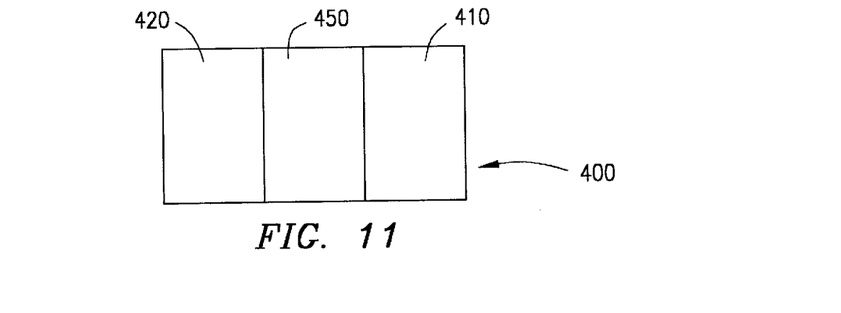
FIG. 11 is an elastic tab with dual side non-elastic zones taken from the second embodiment with deadened lanes at its edges and a center deadened lane.

Referring now to FIG. 11, there is shown an elastic tab 400 with a dual side non-elastic zone 410, 420. The elastic tab 400 is formed by cutting the laminate 200 in the machine direction MD along the center line CL, and cutting a strip of the laminate 200 in the transverse direction TD. The elastic tab 400 includes the first non-elastic zone 410 and a second non-elastic zone 420 on opposite ends of the elastic tab 400, which are each formed by different one of the deadened lanes 210, 220, 230 in the laminate 200. The elastic tab 400 also includes an elastic zone 450 disposed between the two non-elastic zones 410, 420, which is formed by one of the elastic lanes 250, or 260, in the laminate 200. In an exemplary embodiment, either elastic zone 410, 420 of the elastic tab 400, may be joined, such as by gluing, to a sanitary article such as a diaper, to create an ear for attachment to other portions of the diaper. The other non-elastic zone, may be formed to accept mechanical hooks, one side of a hook and pile fasteners, fastening tape, or other fasteners therein.

Although FIGS. 10 and 11 illustrate tabs that have been formed by cutting the laminate 100, 200, in the machine direction MD along a center line, the laminate 100, 200 can be formed with the appropriate number of deadening deadened lanes 110, 120, 210, 220, 230 and the appropriate number of elastic lanes 150, 250, 260 needed to create the desired dead zones 310, 410, 420 and elastic zones 350, 450 in the final elastic tabs 300, 400 without cutting the laminate 100, 200 in the machine direction MD. For example, the tab 300 having only one deadened zone 310 can be created by cutting a laminate having only a single deadened lane and a single elastic lane in the transverse direction. Similarly, the tab 400 having deadened zones 410 and 420 on opposite ends of the tab 400 can be created by cutting a laminate having an elastic lane with deadened lanes on the periphery thereof in the transverse direction. Additionally, the laminate can be cut in the machine direction in multiple locations which may, or may not, include the center line, in order to create any number of elastic tabs by then cutting the laminate in the transverse direction TD.

Figure 12:
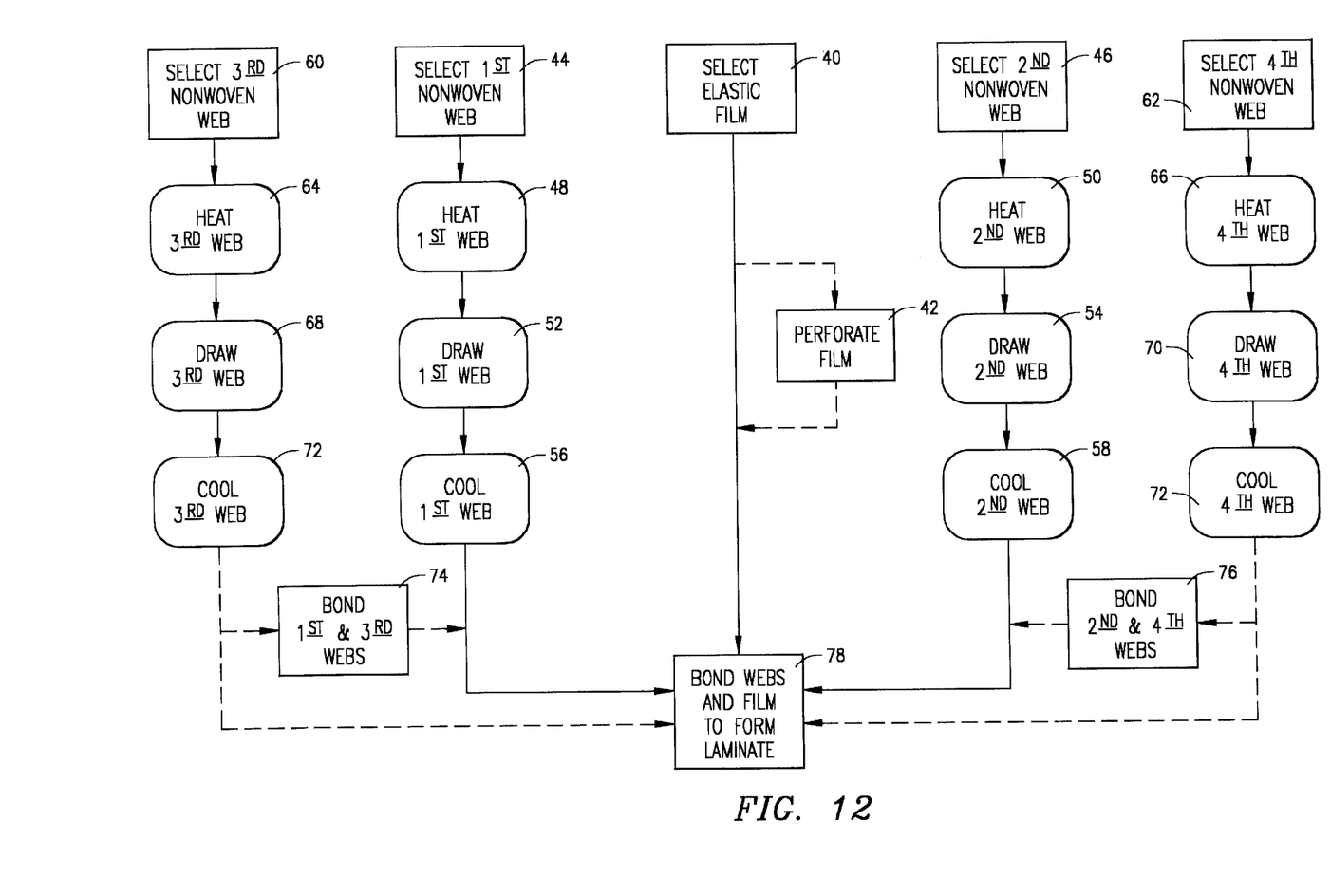
FIG. 12 is a flow diagram of a method for forming a precursor laminate.

In accordance with another aspect of the present invention, a method for forming a laminate is carried out in accordance with the steps outlined in FIG. 12. The steps include selecting an elastomeric polymeric film 103 having a basis weight of from about 18 g/m² to about 100 g/m², as represented by block 40. As noted above, elastomeric film 103 may comprise multiple layers, if so desired. In one embodiment, elastic polymeric film 103 is a metallocene based low density polyethylene about one mil thick, or may be one having a basis weight of from about 18 g/m² to about 25 g/m². If it is desired to form a breathable web, elastomeric film 103 may be perforated, such as by hot needle perforation or vacuum perforation, as indicated by block 42.

First and second precursor nonwoven webs having the properties described above are then selected as represented by blocks 44 and 46. First and second precursor webs are then heated to a temperature between the softening temperature and the melting temperature of at least 10% of the thermoplastic fibers comprising the webs, as indicated at blocks 48 and 50. The heated webs are then drawn in the machine direction, under tension, to cause the web to be elongated in the machine direction and consolidated laterally in transverse direction as represented by blocks 52 and 54 in FIG. 12. First and second webs are then cooled whereby nonwoven webs 101, 102 are consolidated laterally and have an original precursor width to consolidated width ratio of from about 1.3:1 to about 4:1. Cooling steps for the first and second webs are indicated by blocks 56, 58. The consolidation processes for the first and second webs, represented by blocks 44–58 of FIG. 12, are carried out in accordance with the consolidation process described in the above-referenced U.S. Pat. No. Re. 35,206, with the exception of heat setting the drawn webs.

If, in the above-described alternative exemplary embodiment, five-layer laminate 100 as shown in FIG. 4 is formed, the third and fourth nonwoven webs are selected, heated, drawn, and cooled as described above with reference to the first and second nonwoven webs, and as represented by blocks 60–72 of FIG. 12. If desired, first and second nonwoven webs 101a, 101b and third and fourth webs, 102a, 102b, may be bonded to each other as represented at blocks 74 and 76 prior to final assembly of laminate 100. Alternatively, first, second, third and fourth nonwoven webs 101a, 101b, 102a, 102b, may all be simultaneously bonded to elastomeric film 103.

In one embodiment, the stiffening strip 111 is positioned along the edge 107 of the nonwoven 101 and elastomeric film 103. The second stiffening strip 121 is positioned along the edge 109 of the nonwoven 101 and elastomeric film 103. Neither extends fully across film 103 in transverse direction TD. The bottom surface 20 of the first nonwoven 101 is positioned adjacent to the top surface of the stiffening strip 111, and the top surface 14 of the elastomeric film 103 is positioned adjacent to the bottom surface of the stiffening strip 111. Similarly the bottom surface 20 of the first nonwoven 101 is positioned adjacent to the top surface of the second stiffening strip 121, and the top surface 14 of the elastomeric film 103 is positioned adjacent to the bottom surface of the stiffening strip 121. The top surface 24 of the second nonwoven 102 is positioned adjacent to the bottom surface 16 of the elastomeric film 103. The nonwovens 101, 102, the elastomeric film 103 and stiffening strips 111, 121 may be bonded simultaneously by ultrasonic welding or other point fusion welding methods, or some components may be previously bonded. Stiffening strips 111, 121, as bonded, define deadened lanes 110, 120 of laminate 100, or deadened lanes 210, 220, 230 of laminate 200. Bonding occurs by thermal fusion, with the addition of an applied pressure to produce mutually bonded surface areas between the respective nonwoven surfaces and the elastomeric film and stiffening strip surfaces. Bonding is carried out to form a distributed pattern of small point-like weld areas, an exemplary arrangement of which is the geometric pattern illustrated in FIG. 3, and described above. The spaced apart point bonds are created in a distributed pattern such as that illustrated in FIG. 3, in at least 3% of the respective total mutually opposed surface areas.

In another embodiment, the bottom surface 20 of the first nonwoven 101 is positioned adjacent to the top surface 14 of the elastomeric film 103, and the top surface 24 of the second nonwoven 102 is positioned adjacent to the bottom surface 16 of the elastomeric film 103. First deadened lane stiffening bond points 113 are formed to form first deadened lane 110, and second deadened lane stiffening bond points 123 are formed to form second deadened 15 lane 120. The mutually bonded surface areas comprising the stiffening bond points 113, 123 are significantly more than 3% of the surface areas between the respective nonwoven surfaces 20, 24 and the elastomeric film surfaces 14,16. Neither area containing stiffening bond points 113, 123 extends fully across film 103 in transverse direction TD. Stiffening bond points 113, 123 in an exemplary embodiment, are formed by mutually bonding at least about 15% of the surface areas between the respective nonwoven surfaces 20, 24 and the elastomeric film surfaces 14,16, and in a further example, about 20% to about 30% of those surfaces. The stiffening bond points 113, 123 are, in one embodiment, extended in line-segments in the transverse direction TD across the width of the deadened lanes 110, 120. Such stiffening bond points 113, 123 may be about ⅛ in. wide in machine direction MD, and separated by no more than about ¼ in. Other examples of stiffening bond points 113, 123 include discontinuous line-segments not extending uninterrupted across the deadened lanes 110 and 120, respectively, numerous and less widely distributed circular bonding points, or any other series of bonding points that create stiffness within the deadened lanes 110, 120 in the machine direction MD. The encompassing stiffening bond points 113, 123, define deadened lanes 110, 120 of laminate 100, or deadened lanes 210, 220, 230 of laminate 200. The fibers composing nonwovens 101, 102 may be substantially fused during the bonding process to form film-like layers in the stiffening bond points 113, 123. Fibers of the respective nonwovens 101, 102 may further be bonded to one other through the elastic layer 103. Bonding, in one method, includes the step of bonding of the nonwovens 101, 102, and the elastomeric film 103, as described above, to form a distributed pattern of small pointlike common bond areas 26 in the whole area of the laminate, an exemplary arrangement of which is the geometric pattern illustrated in FIG. 3, and described above. In another step, stiffening bond points 113, 123 are formed by ultrasonic welding or other fusion welding methods, to define deadened lanes 110, 120. One such fusion welding method includes drawing nonwovens 101, 102, and elastomeric film 103, over a rotating heated wheel and an opposing wheel, heated or not, pressing against the heated wheel. The heated wheel could be embossed with raised shapes capable of forming line-segment stiffening bond points 113, 123, or other such patterns. The stiffening bond points step may precede or follow the step of bonding the laminate with common bond areas 26. In another method, bonding using common bond areas 26 occurs in the same step for stiffening bond points, such as by ultrasonic welding taking place at the deadened lanes 110, 120 in the greater areal percentages described above.

In another embodiment, stiffening bond zones 112, 122, comprise zones in which substantially all of the areas between first and second, nonwovens 101, 102, and elastomeric film 103, are mutually bonded. First and second, nonwovens 101, 102, and elastomeric film 103 are placed as described as for stiffening bond points 113, 123. The first and second nonwovens 101, 102 may additionally form film-like layers within the stiffening bond zones 112, 122, as described above, and may experience inter-web fiber bonding through the elastomeric film 103. Stiffening bond zones 112, 122 are formed similarly to stiffening bond joints 113, 123 above, including by a heated wheel lacking embossments, so as to bond substantially all of the areas between first and second, nonwovens 101, 102, and elastomeric film 103 in the stiffening bond zones 112, 122. Neither stiffening bond zones 112, 122 extend fully across film 103 in the transverse direction TD.

In another embodiment, a first adhesive layer 114 is positioned adjacent to the top surface 14 of the elastomeric film 103, and the bottom surface 20 of the first nonwoven 101 is positioned adjacent to and in contact with the adhesive layer 114. Adhesive layer 114 is positioned along the edge 107 of the nonwoven 101 and elastomeric film 103. The second adhesive layer 124 is positioned along the edge 109 of the nonwoven 101 and elastomeric film 103. A second adhesive layer 124 is positioned adjacent to the bottom surface 16 of the elastomeric film 103, and the top surface 24 of the second nonwoven 102 is positioned adjacent to and in contact with the adhesive layer 124. Neither extends fully across film 103 in transverse direction TD. Thus the elastomeric film 103 is bonded to the nonwovens 101, 102, and the fibers of the nonwovens bond to other fibers therein. The first deadened lane 110 is created by first adhesive layer 114, and the second deadened lane 120 is created by second adhesive layer 124.

Although the present invention is described in terms of preferred exemplary embodiments, with specific measured values of illustrative components, those skilled in the art will recognize that changes in those components which may result in different measured values, but still be in accordance with the teachings of the present invention, may be made without departing from the spirit of the invention. Such changes are intended to fall within the scope of the following claims. Other aspects, features, and advantages of the present invention may be obtained from a study of this disclosure and the drawings, along with the appended claims.

What is claimed is:

1. A laminate comprising:
   an elastic web having a first surface and a second surface;
   a first nonwoven bonded to the first surface of the elastic web;
   a second nonwoven bonded to the second surface of the elastic web;
   wherein a first region of said laminate defines an elastic lane and a second region of said laminate defines a first stiffened lane; and
   wherein a ratio of the force required to obtain 5% deformation of said stiffened lane to the force required to obtain 5% deformation of said elastic lane is at least approximately 4.

2. The laminate according to claim 1, further including a first stiffening strip disposed between the first nonwoven and the elastic film in the region defining the first stiffened lane.

3. The laminate according to claim 1, wherein said first stiffened lane comprises a first bond zone having the first nonwoven and the second nonwoven bonded continuously to the elastic layer.

4. The laminate according to claim 1, wherein said first stiffened lane includes bond points inhibiting elastic behavior across the stiffened lane.

5. The laminate according to claim 1, further including a stiffening adhesive between said first nonwoven and the elastic web in the first stiffened lane.

6. The laminate according to claim 1, further including a third region of said laminate defining a second stiffened lane, wherein said elastic lane is disposed between said first stiffened lane and said second stiffened lane.

7. The laminate according to claim 1, wherein:
   said stiffened lane is approximately 25 mm wide.

8. The laminate according to claim 1, wherein:
   said ratio of the force required to obtain 5% deformation of said stiffened lane to the force required to obtain 5% deformation of said elastic lane is at least approximately 5.

9. A laminate comprising:
   an elastic web having a first surface and a second surface;
   a first nonwoven bonded to the first surface of the elastic web;
   a second nonwoven bonded to the second surface of the elastic web;
   wherein said laminate includes an elastic lane and a stiffened lane; and
   wherein the force required for 5% transverse deformation of said stiffened lane is at least approximately 1000 g/inch.

10. The laminate according to claim 9, further including a first stiffening strip disposed between the first nonwoven and the elastic film in the area of the stiffened lane.

11. The laminate according to claim 9, wherein said first stiffened lane comprises a bond zone having the first nonwoven and the second nonwoven bonded continuously to the elastic layer.

12. The laminate according to claim 9, wherein said first stiffened lane includes at least one bond point inhibiting elastic behavior across the stiffened lane.

13. The laminate according to claim 9, further including stiffening adhesive between said first nonwoven and the elastic web in the stiffened lane.

14. The laminate according to claim 9, further including at least two stiffened lanes, wherein said elastic lane is disposed between two stiffened lanes.

15. The laminate according to claim 9, wherein:
   said stiffened lane is approximately 25 mm wide.

16. The laminate according to claim 9, wherein:
   wherein the force required for 5% transverse deformation of said stiffened lane is at least approximately 1500 g/inch.

* * * * *

UNITED STATES PATENT AND TRADEMARK OFFICE
CERTIFICATE OF CORRECTION

PATENT NO. : 6,255,236 B1
DATED : July 3, 2001
INVENTOR(S) : James W. Cree et al.

It is certified that error appears in the above-identified patent and that said Letters Patent is hereby corrected as shown below:

<u>Title page,</u>
Item [61], insert -- Continuation-in-Part of Ser. No. 09/490,337, Jan. 24, 2000. --.

<u>Column 1,</u>
Line 4, insert -- RELATED APPLICATION SECTION
The present application is a continuation in part of U.S. Application Serial No. 09/490,337, filed on January 24, 2000, now abandoned. --.

<u>Column 10,</u>
Line 30, after "deadened", delete "15".

Signed and Sealed this

Twenty-third Day of April, 2002

*Attest:*

*Attesting Officer*

JAMES E. ROGAN
*Director of the United States Patent and Trademark Office*